United States Patent
Boeckmann et al.

(10) Patent No.: US 7,162,855 B2
(45) Date of Patent: Jan. 16, 2007

(54) HARVESTING HEADER HAVING LATERALLY MOVABLE SEPARATING POINTS

(75) Inventors: Norbert Boeckmann, Stadtlohn (DE); Dirk Bongert, Stadtlohn (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/438,154

(22) Filed: May 13, 2003

(65) Prior Publication Data
US 2003/0226342 A1  Dec. 11, 2003

(30) Foreign Application Priority Data
May 17, 2002 (DE) ................ 102 21 983

(51) Int. Cl.
*A01D 34/00* (2006.01)
(52) U.S. Cl. ....................................... 56/15.2
(58) Field of Classification Search .......... 56/85, 56/94, 14.7, 15.2, 15.9, 208, 228, 212, 214, 56/119
See application file for complete search history.

(56) References Cited

U.S. PATENT DOCUMENTS

| | | | |
|---|---|---|---|
| 4,903,470 A * | 2/1990 | Hemker et al. | 56/228 |
| 5,673,543 A * | 10/1997 | Richardson et al. | 56/85 |
| 5,845,472 A * | 12/1998 | Arnold | 56/94 |
| 5,911,625 A * | 6/1999 | von Allworden | 460/119 |
| 2002/0035826 A1* | 3/2002 | Albinger et al. | 56/109 |

FOREIGN PATENT DOCUMENTS

| | | |
|---|---|---|
| DE | 73 42 482 | 3/1976 |
| DE | 85 34 520 | 3/1986 |
| DE | 85 35 733 | 3/1986 |
| DE | 195 23 255 A1 | 1/1997 |
| EP | 0 131 853 | 1/1985 |
| EP | 0 301 177 | 2/1989 |
| EP | 0 534 199 A1 | 3/1993 |
| EP | 539745 A1 * | 5/1993 |
| EP | 540881 A1 * | 5/1993 |
| EP | 540882 A1 * | 5/1993 |
| EP | 1036495 A1 * | 9/2000 |
| EP | 1 142 467 A1 | 10/2001 |
| EP | 1 179 292 A1 | 2/2002 |

* cited by examiner

*Primary Examiner*—Árpád Fábián Kovács

(57) ABSTRACT

A harvesting header comprising a center frame section and two outer frame sections. The outer frame sections can pivot relative to the center frame section between an operating position and a transport position. The center frame section and the outer frame sections carry collection devices for gathering crops and there is a separating point that moves automatically between an operating position and a transport position in the pivot region between the center frame section and the outer frame sections. The separating points arranged in the pivot region between the center frame section and the outer frame sections move between the operating position and the transport position in the horizontal direction perpendicular to the direction of travel and/or to pivot about the height axis.

12 Claims, 3 Drawing Sheets

HARVESTING HEADER HAVING LATERALLY MOVABLE SEPARATING POINTS

FIELD OF THE INVENTION

The present invention is directed to a folding harvesting header comprising a center frame section and two outer frame sections which can be pivoted relative to the center frame section between an operating position and a transport position. Separating points are arranged in the pivot region between the center frame section and the outer frame sections that automatically move between an operating position and a transport position.

BACKGROUND OF THE INVENTION

DE 73 42 482 U discloses a one-piece corn picking header, for which the outer separating points can move in the lateral direction between a transport position and an operating position. This solution is suitable for only relatively small operating widths.

EP 0 534 199 A discloses a corn harvesting apparatus for combines with eight collection channels. The middle four collection channels are connected rigidly to the harvesting machine, while the two outermost collection channels can be pivoted upwards into a transport position. Because the collection channels extend diagonally outwards, it has proven to be important for preventing collisions to first move the pivotable collection channels laterally outwards before they are pivoted.

EP 1 142 467 A discloses a harvesting header in the form of a picker, for which side frame parts can be pivoted upwards relative to the center frame section. A shield element is arranged in the pivot area between the center frame section and the side frame part. It is mounted on an intermediate frame so that it can pivot, and a shaft extending in the direction of motion connects the intermediate frame to the main frame so that the intermediate frame can pivot. Before the side frame part is brought into the transport position, the shield element is rotated into a position for preventing collisions by rotating the intermediate frame. This harvesting header can be seen to be disadvantageous because the mechanism with the intermediate frame is rather complicated.

EP 1 179 292 A discloses a harvesting header for which the outermost separating points are pivoted outwards into the transport position in order to prevent collisions between these separating points above the main frame. However, this does not change the transport width.

SUMMARY OF THE INVENTION

It is an object of the present invention to provide a harvesting header that can be folded into a transport width in a simple way.

A harvesting header has a center frame section and outer frame sections which are attached to the outer ends of the center frame section. The frame sections are each equipped with an arbitrary number of collection devices for collecting crops. Thus, the header can be a picking device for a picker or a mowing drum for a corn chopper. The outer frame sections can pivot about horizontal axes extending in the direction of travel upwards and usually inwards, i.e., by approximately 180°, into a transport position. In the two pivot regions of the pivot bearing between the outer frame sections and the center frame section there are separating points, which are used for lateral deflection of plants. These separating points can move independently of the other frame parts between an operating position and a transport position. It is proposed that these separating points be able to move in the lateral direction and/or pivot about the height axis so that they can move between the operating position and the transport position.

In this way, the harvesting header can be moved in a simple way into a compact transport position, collisions of the separating points with the frame parts or vice versa can be prevented by pivoting the outer frame sections.

Certain collection devices are asymmetrical relative to their longitudinal center plane, such as collection and picking devices with grippers rotating about the height axis, next to which a picking gap is arranged. For simplifying production, it is important to use only similar types of collection devices for the entire harvesting header, or at least for the center frame section. For such collection devices, it can be problematic if the two separating points in the pivot region between the center frame section and the outer frame section are supported on the center part, because for one of the separating points, collisions with the adjacent collection device are conceivable. More specifically, such collection devices allow one of these separating points to be fixed to the outer frame section, while the other separating point is attached to the center frame section. In this way, the separating point mounted on the outer frame section pivots with the outer frame section into its transport position, and, in its transport position, it cannot collide with the adjacent collection device of the center part, while the separating point attached to the center frame section does not pivot.

If the outer frame sections and the separating points arranged in their pivot region are located in the operating position, when the outer frame sections are pivoted into the transport position, collisions with the separating points in the pivot region are conceivable. Therefore, preferably the separating points are first brought into their transport position before the outer frame sections are pivoted. Therefore, the pivot means for pivoting the outer frame sections are only activated when the devices for moving the separating points have been completely brought into their transport position. Analogously, first the outer frame sections are lowered before the separating points are moved into their operating position.

The devices for moving the separating points can also have means on the inner frame part to lock the outer frame sections in the operating position. Thus, the locking of the outer frame sections is automatically released when the separating points are brought into the transport position, and automatically re-established when the separating points are guided into the operating position.

DETAILED DESCRIPTION

Figure 1:
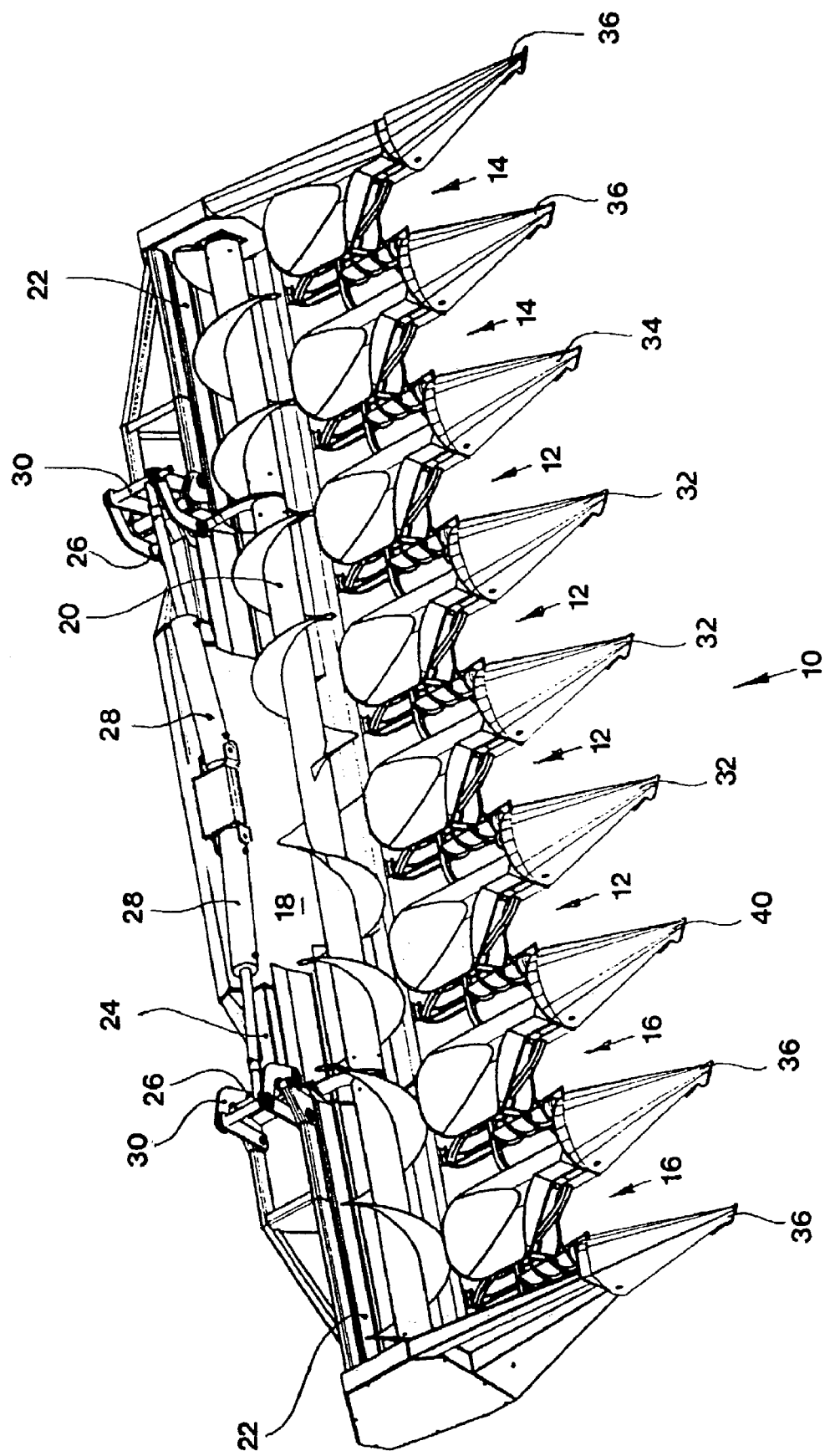
FIG. 1 is a front perspective view of a harvesting header.

Harvesting header 10 illustrated in FIG. 1, is suitable for harvesting corn, sunflowers, and other plants with stalks. The harvesting header 10 includes eight similar type collection devices 12, 14 and 16, which are arranged in line one next to another with corresponding picking devices and which are used for collecting plants. The picking devices separate the fruit from the plant. The picked fruit is directed to a cross auger 20 arranged at the rear of the collection devices 12,14 and 16 to a center feed opening 18. From the center feed opening 18 the harvested fruit is directed to a feeder house of a combine. The unharvested plant residue is chopped up or returned as a whole on the field. The collection devices 12,14 and 16 include grippers rotating about a horizontal axis, which grip the plant stalk and transport it over the length of the picking gap, where the plants are pulled downwards through interacting stalk rolls. The design of the individual collection devices is described in DE 101 51 198, whose publication is also cited. The collection devices are asymmetrical relative to their longitudinal center plane because the picking gap is arranged at the side next to the feed auger.

The harvesting header 10 can move between an operating position, as illustrated in FIG. 1, and a transport position. Each of the two outer collection devices 14 and 16 and the outer parts of the cross auger 20 are fixed to the outer frame sections 22. The outer frame sections 22 are hinged to a center frame section 24 so that the outer frame sections can pivot about horizontal pivot shafts 26 running in the direction of travel. The center frame section 24 carries the center collection devices 12. Hydraulic pivot cylinders 28 are used to fold the outer frame sections 22 about the center frame section 24. The hydraulic pivot cylinders 28 are hinged on both sides of the longitudinal center plane of the harvesting header 10 to the center frame section 24 and are connected by coupling assemblies 30 to the outer frame sections 22, the outer frame sections 22 can fold upwards and inwards about the pivot axis 26. The coupling assemblies 30 allow the outer frame sections 22 to be laid over the center frame section 24 when in the transport position. Thus, in the transport position, the outer collection devices 14 and 16 are located above the inner collecting and picking units 12. In this way, the combine can join street traffic without having to remove the harvesting header 10 from the feeder house and loading it onto a wagon or the like.

Between each adjacent collection device 12, 14 and 16 and at the outer sides of each outermost collection device 14 and 16, there are separating points 32, 34, 36 and 40 mounted in the direction of travel in front of the collection devices 12, 14 and 16. They are used to deflect the plants to the side, so that the plants can be gripped by the grippers of the collection devices 12,14 and 16 and pulled into the picking gap.

If the separating points 34 and 40 arranged between the center frame section 24 and the outer frame sections 22 were attached rigidly to the center frame section 24, they would define the transport width of the harvesting header 10. If the operating width of each of the individual collection devices 12, 14 and 16 is 0.75 m, acceptable transport widths, which are currently equal to 3.5 m in Germany, can be maintained either only with difficulty or not at all. In addition, there is the risk of collision between the collection devices 14 and 16 and the separating points 34 and 40 when the outer frame sections 22 are pivoted upwardly and inwardly. For these reasons, the separating points 34 and 40 are mounted so that they can move laterally. The separating point 34 arranged on the left edge of the center frame section 24 with reference to the direction of travel is pushed to the right from the position illustrated in FIG. 1 when the harvesting header 10 is brought into the transport position. It is attached to the center frame section 24. The separating point 40 arranged in the direction of travel directly to the left next to the left collection device 16 of the right outer frame section 22 is likewise pushed to the right when the harvesting header 10 is brought into the transport position. It is supported on the right outer frame section 22 and is thus pivoted both upwards and inwards.

Figure 2:
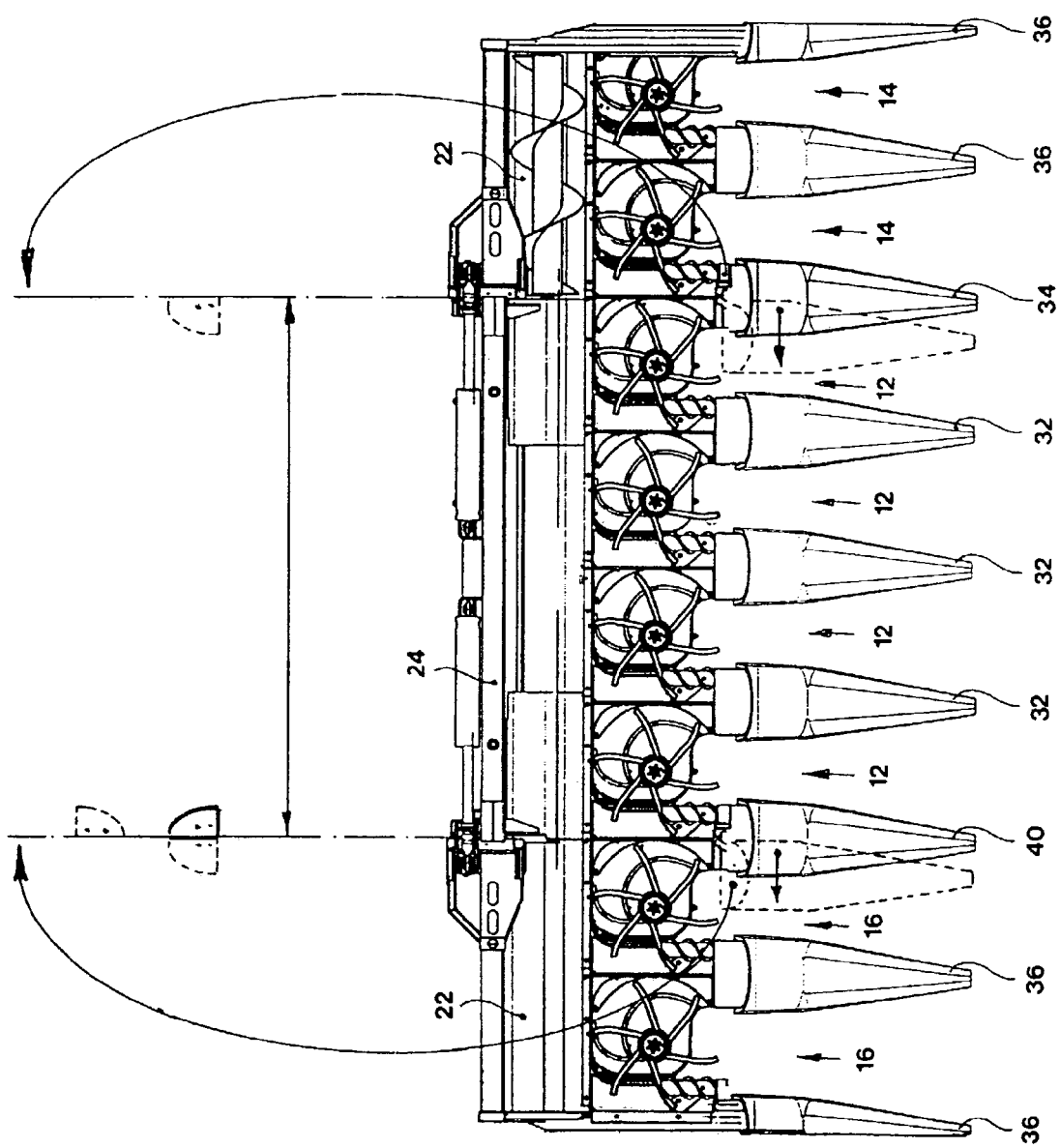
FIG. 2 is a top view of the harvesting header illustrating the movement of the harvesting header between the operating and the transport positions.

This motion between the operating and transport positions and vice versa is illustrated schematically in FIG. 2, with reference to which, it can also be seen that the separating points 34 and 40 do not affect the width of the harvesting header 10 in the transport position. In the top region of FIG. 2, receivers for the separating points are shown schematically, i.e., holder elements arranged in its rear region. One can see that the divided receivers of the separating points 34 and 40 also do not project over the width of the center frame section 24.

Figure 3:
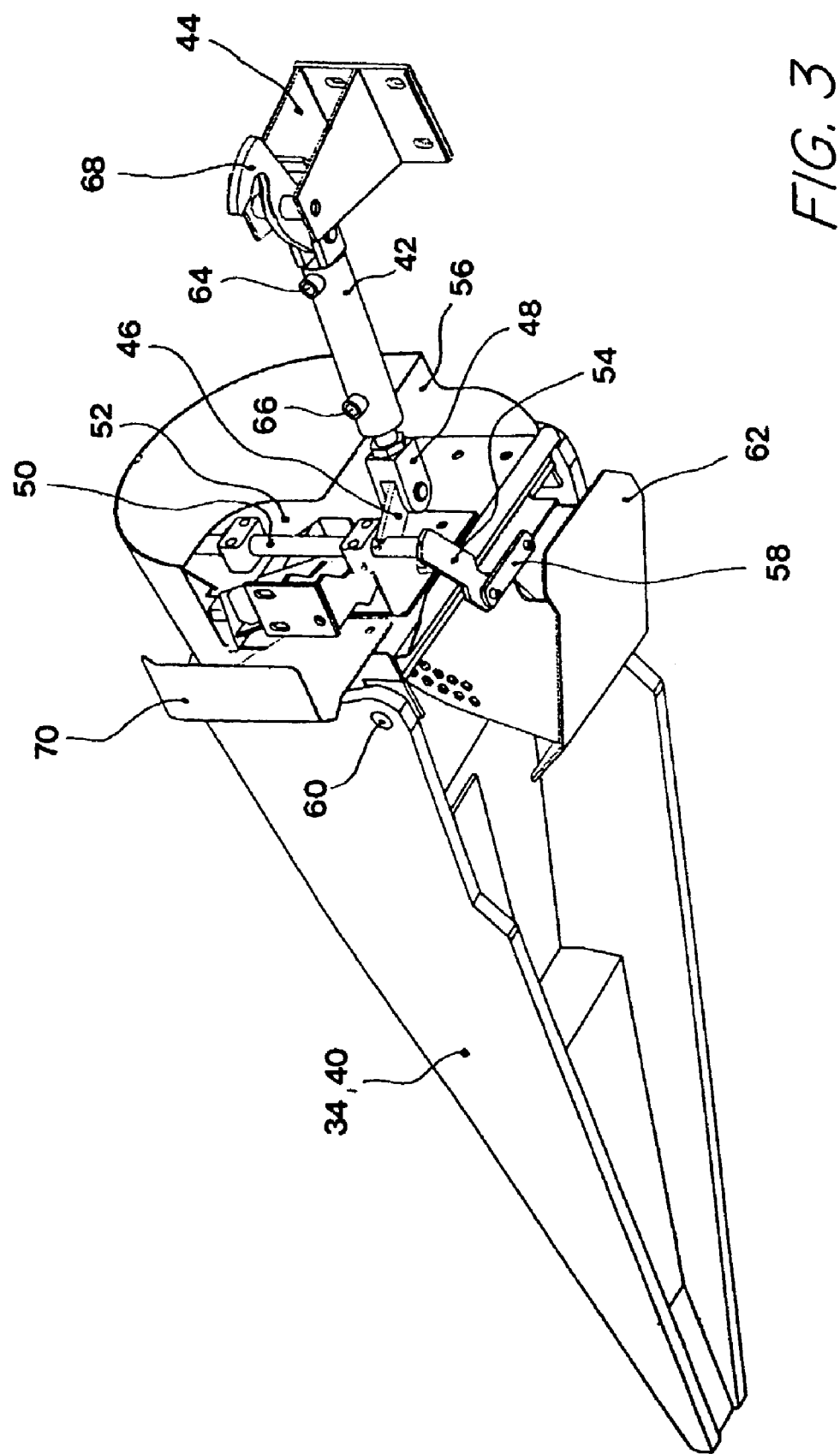
FIG. 3 is a rear perspective view of a separating point with a shift mechanism.

Each separating point 34 and 40 can each be moved by a corresponding hydraulic cylinder 42, which is illustrated in FIG. 3. The hydraulic cylinder 42 is hinged at its rear end to a console 44, which is attached for the separating point 34 to the center frame section 24 and for the separating point 40 to the outer frame section 22. The hydraulic cylinder 42 is hinged at its front end in the direction of travel by means of a fork 48 to a pivot arm 46, which is connected rigidly to a rod 50. The rod 50 extends approximately vertically and is supported on a plate 52 so that it can rotate about its longitudinal axis. The plate 52 is connected for the separating point 34 to the center frame section 24 and for the separating point 40 to the outer frame section 22. At its lower end, the rod 50 is connected rigidly to a pivot arm 54, which is coupled on its other end by means of a connecting bar 58 to a bearing block 56, which is attached to the separating point 34 or 40. The bearing block 56 is supported on the plate 52 so that it can move in the lateral direction. The separating point 34 or 40 is hinged on the bearing block 56 so that it can pivot about a horizontal axis 60 extending perpendicular to the direction of travel, so that the separating point is lifted while traveling over uneven ground. The bearing block 56 is attached to a skid 62, which is located on the bottom side of the harvesting header 10 and on which the header is supported during harvesting work.

If the rear chamber of the double-acting hydraulic cylinder 42 on the connection 64 is charged, the separating points 34 and 40 are pushed to the left into the operation position. If the front chamber of the hydraulic cylinder 42 is charged, the separating points 34 and 40 are pushed to the right into the transport position. In this way, the hydraulic cylinder 42 rotates to its rear end in the console 44. A latch 68 is connected to this end of the hydraulic cylinder 42, which also turns when the separating points 34 and 40 are moved between the operating and transport positions. In the operating position, the latch 68 of the hydraulic cylinder 42 of the separating point 40 catches behind a corresponding locking element on the center frame section 24 and the latch 68 of the hydraulic cylinder 42 of the separating point 34 catches behind a corresponding locking element on the left frame section 22. In this way, an automatic locking of the outer frame sections 22 to the center frame section 22 is achieved in the operating position without additional active elements. A metal sheet panel 70 to the left next to the rear side of the separating point 34 and 40 is used for protecting a top feed auger of the collection device 12, 14 and 16.

To bring the harvesting header 10 out of the operating position into the transport position, first the hydraulic cylinder 42 is charged to move the separating points 34 and 40 to the right relative to the direction of travel and to release the latches 68. As soon as suitable sensors output signals that the hydraulic cylinder 42 has brought the separating points 34 and 40 into the transport position, the pivot cylinder 28 is activated to pivot the outer frame sections 22 upwards and inwards. The motion of the harvesting header 10 into the operating position is performed in the reverse sequence, wherein suitable sensors detect when the operating position of the outer frame sections 22 has been reached and then trigger the activation of the hydraulic cylinder 42, which brings the separating points into their operating position and the latches 68 lock at the locking elements.

Having described the illustrated embodiment, it will become apparent that various modifications can be made without departing from the scope of the invention as defined in the accompanying claims.

The invention claimed is:

1. A harvesting header having a direction of travel is provided with a center frame section having two side ends and two outer frame sections, the two outer frame sections are attached to the side ends of the center frame section, the two outer frame sections can pivot relative to the center frame section between an operating position and a transport position in which the outer frame sections are folded about the center frame section by hydraulic pivot cylinders, the side ends of the center frame section define pivot regions between the outer frame sections and the center frame section, the center frame section and the outer frame sections carry collection devices for collecting crops with separating points between each adjacent collection device, each separating point movably supported on one of the outer frame section and center frame section, the separating points including a first separating point located in a first one of the pivot regions and a second separating point located in a second one of the pivot regions, and a hydraulic cylinder attached between each of the first and second separating points and the frame section on which the first and second separting points are mounted to move the first and second separating points between an operating position and a transport position laterally independently with respect to one of the outer frame section and center frame section on which the separating point is supported in a horizontal direction perpendicular to the direction of travel.

2. The harvesting header as defined by claim 1 wherein at least the collection devices of the center frame section are asymmetrical relative to their longitudinal center plane.

3. The harvesting header as defined by claim 2 wherein one of the separating points arranged in the pivot region between the center frame section and the outer frame sections is attached to the center frame section and the other separating point arranged in the pivot region between the center frame section and the outer frame sections is attached to the outer frame section.

4. The harvesting header as defined by claim 3 wherein the separating points arranged in the pivot region move in the same direction between the transport position and the operating position.

5. The harvesting header as defined by claim 4 wherein each hydraulic pivot cylinder only brings the outer frame sections from the operating position into the transport position when the hydraulic cylinders for moving the separating points laterally have brought the separating points into the transport position.

6. The harvesting header as defined by claim 5 wherein the hydraulic cylinders only bring the separating points in the pivot region from the transport position into the operating position when the hydraulic pivot cylinders have brought the outer frame from the transport position into the operating position.

7. The harvesting header as defined by claim 6 wherein the hydraulic pivot cylinders are aligned to lock the outer frame sections in the operating position on the center frame sections.

8. The harvesting header as defined by claim 1 wherein one of the separating points arranged in the pivot region between the center frame section and the outer frame sections is attached to the center frame section and the other separating point arranged in the pivot region between the center frame section and the other outer frame section is attached to the other outer frame section.

9. The harvesting header as defined by claim 8 wherein the separating points arranged in the pivot region move in the same direction between the transport position and the operating position.

10. The harvesting header as defined by claim 1 further comprising hydraulic cylinders for laterally moving the separating points in the pivot region between the operating position and the transport position, the hydraulic cylinders are coupled to a hydraulic pivot cylinder for pivoting the outer frame sections relative to the center frame section such that the hydraulic pivot cylinder only brings the outer frame from the operating position into the transport position when the hydraulic cylinders for laterally moving the separating points have brought the separating points into the transport position.

11. The harvesting header as defined by claim 10 wherein the hydraulic cylinders for laterally moving the separating points in the pivot region are coupled with the hydraulic pivot cylinders for pivoting the outer frame sections such that the hydraulic cylinders for laterally moving the separating points only bring the separating points from the transport position into the operating position when the hydraulic pivot cylinders have brought the outer frame from the transport position into the operating position.

12. A method of folding a harvesting header having a direction of travel, the harvesting header comprising a center frame section having two side ends and two outer frame sections, the two outer frame sections are attached to the side ends of the center frame section, the two outer frame sections can pivot relative to the center frame section between an operating position and a transport position, the side ends define pivot regions between the outer frame sections and the center frame section, the center frame section and the outer frame sections carry collection devices for collecting crops, separating points movably supported on one of the center frame section and outer frame section including a first separating point located in a first one of the pivot regions and a second separating point located in a second one of the pivot regions, the method comprising the following steps:

laterally shifting the first and second separating points located in the pivot regions in a horizontal direction perpendicular to the direction of travel independently with respect to the outer frame section or center frame section on which the separating points are supported; and pivoting the outer frame sections relative to the center frame section.

* * * * *